(12) United States Patent
Charles et al.

(10) Patent No.: US 9,068,600 B2
(45) Date of Patent: Jun. 30, 2015

(54) ROLLING BEARING WITH ROLLING BODIES AND FLANGE

(71) Applicants: Emmanuel Charles, Savonnieres (FR); Bruno Constant, Tours (FR)

(72) Inventors: Emmanuel Charles, Savonnieres (FR); Bruno Constant, Tours (FR)

(73) Assignee: AKTIEBOLAGET SKF, Goteborg (SE)

( * ) Notice: Subject to any disclaimer, the term of this patent is extended or adjusted under 35 U.S.C. 154(b) by 14 days.

(21) Appl. No.: 13/927,926

(22) Filed: Jun. 26, 2013

(65) Prior Publication Data

US 2014/0023304 A1     Jan. 23, 2014

(51) Int. Cl.
*F16C 33/80* (2006.01)
*F16C 33/30* (2006.01)
*F16C 33/78* (2006.01)
*F16J 15/44* (2006.01)
*F16C 19/06* (2006.01)

(52) U.S. Cl.
CPC ............ *F16C 33/30* (2013.01); *F16C 33/7889* (2013.01); *F16C 33/785* (2013.01); *F16C 2226/52* (2013.01); *F16C 19/06* (2013.01); *F16C 2240/40* (2013.01); *F16C 2240/70* (2013.01); *F16C 2240/30* (2013.01); *F16C 2300/02* (2013.01); *F16J 15/44* (2013.01)

(58) Field of Classification Search
CPC ........................... F16C 33/785; F16C 33/7889
USPC .................................................. 384/480, 488
See application file for complete search history.

(56) References Cited

U.S. PATENT DOCUMENTS

| | | | | | |
|---|---|---|---|---|---|
| 4,236,767 | A | * | 12/1980 | Feldle | 384/488 |
| 4,438,990 | A | * | 3/1984 | Schalk et al. | 384/480 |
| 5,435,654 | A | * | 7/1995 | Ishida et al. | 384/488 |
| 6,283,634 | B1 | * | 9/2001 | Tanaka | 384/480 |
| 2002/0015543 | A1 | * | 2/2002 | Pairone et al. | 384/477 |
| 2007/0154124 | A1 | * | 7/2007 | Inoue et al. | 384/488 |
| 2010/0220943 | A1 | | 9/2010 | Mikami et al. | |

FOREIGN PATENT DOCUMENTS

| | | |
|---|---|---|
| FR | 2250043 A1 | 5/1975 |
| JP | 2000249154 A | 9/2000 |
| JP | 2010196845 A | 9/2010 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A rolling bearing with rolling bodies includes an outer ring, an inner ring and rolling bodies arranged in a rolling chamber. The rolling bearing includes at least one flange mounted on a first ring and extending to a second ring and fastened onto the first ring and a first annular band at right angles to an axis of rotation of the rings and offset, along the axis, relative to the fastened portion. The flange provides a second annular band and a third annular band arranged respectively radially inside and radially outside the first band and offset axially in the direction of the rolling bodies, using a first setback and a second setback. An edge of the flange, opposite to the portion fastened onto the first ring, is folded back towards the rolling chamber and extends in a direction parallel to a radial surface of the second ring.

17 Claims, 4 Drawing Sheets

ROLLING BEARING WITH ROLLING BODIES AND FLANGE

CROSS-REFERENCE TO RELATED APPLICATIONS

This application claims priority to French patent application no. 1256059 filed Jun. 26, 2012, the contents of which are fully herein incorporated by reference.

TECHNICAL FIELD

The present invention relates to a rolling bearing with rolling bodies to be used to support, relative to one another, two parts that need to have a relative rotational movement.

BACKGROUND OF THE INVENTION

In the field of rolling bearings, it is known practice to equip a rolling bearing with one or two flanges provided to isolate, from the outside, a rolling chamber defined between the two rings of a rolling bearing and in which rolling bodies are arranged. JP-A-2000 249 154 thus proposes mounting two flanges on the two opposite sides of a ball bearing. These flanges have a relatively great thickness and their geometry is such that the inner and outer rings of the rolling bearing have to be substantially wider, in a direction parallel to the axis of rotation of the rings, than the rolling chamber, in order to avoid having these flanges extend laterally beyond these rings or having them come into contact with parts placed in the environment of the rolling bearing during use. When it is being mounted on one of the rings, one flange risks tilting about its point of fastening onto the ring as a consequence of a phenomenon called "umbrella effect" which tends to fold back the flange towards the outside or the inside of the rolling bearing. With the equipment known from JP-A-2000 249 154, this umbrella effect is all the more damaging when the edge of the flange opposite to its means for fastening onto a ring is oriented towards the outside of the rolling bearing, to the extent that it extends laterally beyond the rolling bearing when the flange is not at right angles to the axis of rotation of the rolling bearing. On the other hand, if the geometry of the flange is modified, the latter risks coming into contact with the cage which holds the balls in place in the rolling chamber.

It is these drawbacks that the invention intends more particularly to remedy by proposing a novel rolling bearing with rolling bodies whose flange effectively isolates the rolling chamber from the outside, without the risk of interference with a cage or the rolling bodies arranged in the rolling chamber or with parts situated in the vicinity of the rolling bearing, since the flange does not extend axially beyond the rings of the rolling bearing.

SUMMARY OF THE INVENTION

To this end, the invention relates to a rolling bearing with rolling bodies comprising an outer ring, an inner ring, as well as rolling bodies arranged in a rolling chamber formed between the outer ring and the inner ring. This rolling bearing also comprises at least one flange mounted on a first ring, out of the outer and inner rings, and extending to the vicinity of the second ring, out of the outer and inner rings, this flange comprising means for fastening onto the first ring and a first annular band at right angles to an axis of rotation of the rings relative to one another. In accordance with the invention, the flange also comprises a second annular band and a third annular band arranged respectively radially inside and radially outside the first band and offset relative thereto, along the axis of rotation and in the direction of the rolling bodies, by means of a first setback and a second setback respectively linking the first and second bands and the first and third bands. An edge of the flange opposite to its means for fastening onto the first ring is folded back towards the rolling chamber and extends in a direction parallel to a radial surface of the second ring.

By virtue of the invention, the geometry of the flange enables it to exhibit a sufficient rigidity to ensure a function of isolation of the rolling chamber from the outside, because of the existence of the two setbacks, while exhibiting a relatively small axial bulk, which limits the risk of interference between this flange and its environment, both on the side of the rolling chamber and towards the outside. Finally, the folded-back edge makes it possible to limit the ingress of pollution into the rolling chamber without the risk of extending outside the rings as a result of an umbrella effect.

According to aspects of the invention that are advantageous but not obligatory, such a rolling bearing can incorporate one or more of the following features, taken in all technically acceptable combinations:

- a first ratio of the thickness of the flange to its axial width, measured parallel to the axis of rotation, is less than 0.2.
- a second ratio of the mean radius of the first setback to the mean radius of the rolling bearing is between 0.85 and 0.95, preferably equal to 0.9.
- a third ratio of the mean radius of the second setback to the mean radius of the rolling bearing is between 1.05 and 1.15, preferably equal to 1.09.
- the first annular band, which is at right angles to the axis of rotation of the rings relative to one another, is offset along this axis relative to the fastening means.
- the thickness of the flange is less than or equal to 0.5 mm, preferably equal to 0.4 mm.
- the folded-back edge of the flange extends over an axial length, of which the ratio with the thickness of the flange is greater than 4, preferably greater than 5.
- the mean radius of the rolling bearing is greater than or equal to 75 mm, preferably greater than or equal to 90 mm, even more preferably equal to 100 mm.
- the flange is crimped in place onto the first ring and the fastening means comprise at least a part of the flange plastically deformed during the crimping of the flange onto the first ring.
- the first ring is the outer ring of the rolling bearing.
- the flange comprises a fourth band arranged radially between the third band and the fastening means and offset relative to this third band, along the axis of rotation and in the direction of the rolling bodies, by means of a third setback.
- the fourth band can be accessed from outside the rolling bearing, in a direction parallel to the axis of rotation, to be subjected to a pressing force against a corresponding surface of the first ring.

BRIEF DESCRIPTION OF THE DRAWINGS

The invention will be better understood and other advantages thereof will become more clearly apparent in light of the following description of an embodiment of a rolling bearing according to its principle, given solely as an example and with reference to the appended drawings in which.

DETAILED DESCRIPTION OF THE INVENTION

Figure 1:
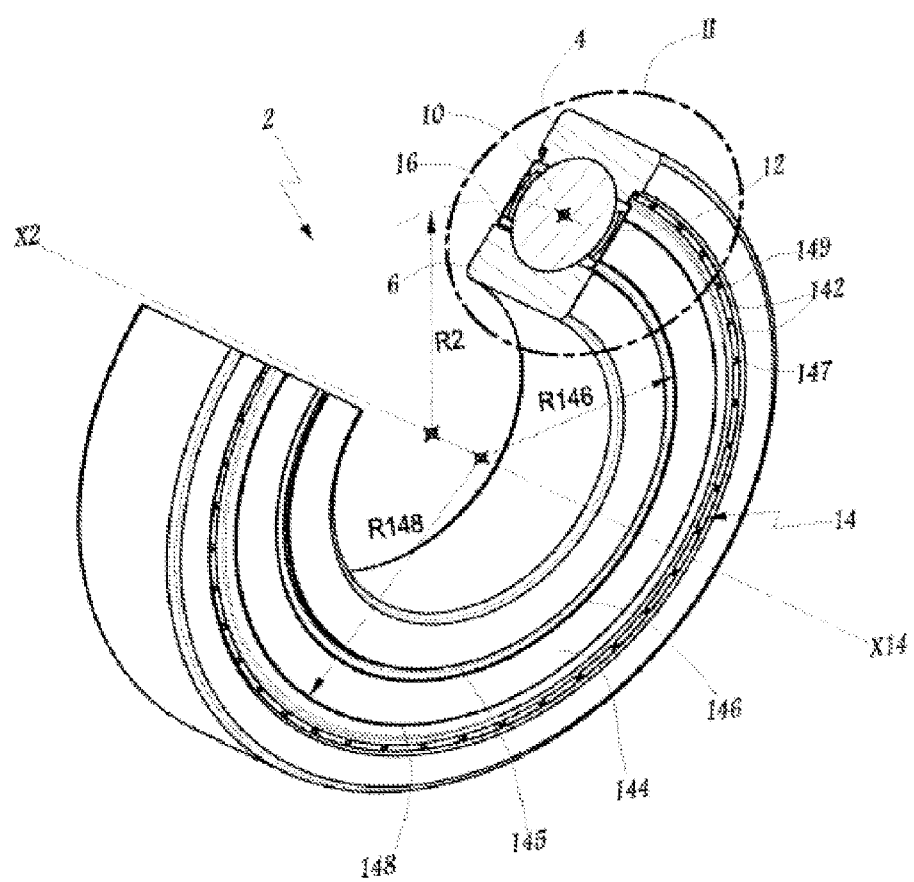
FIG. 1 is a perspective view, with partial cutaway, of a rolling bearing according to the invention.
Figure 2:
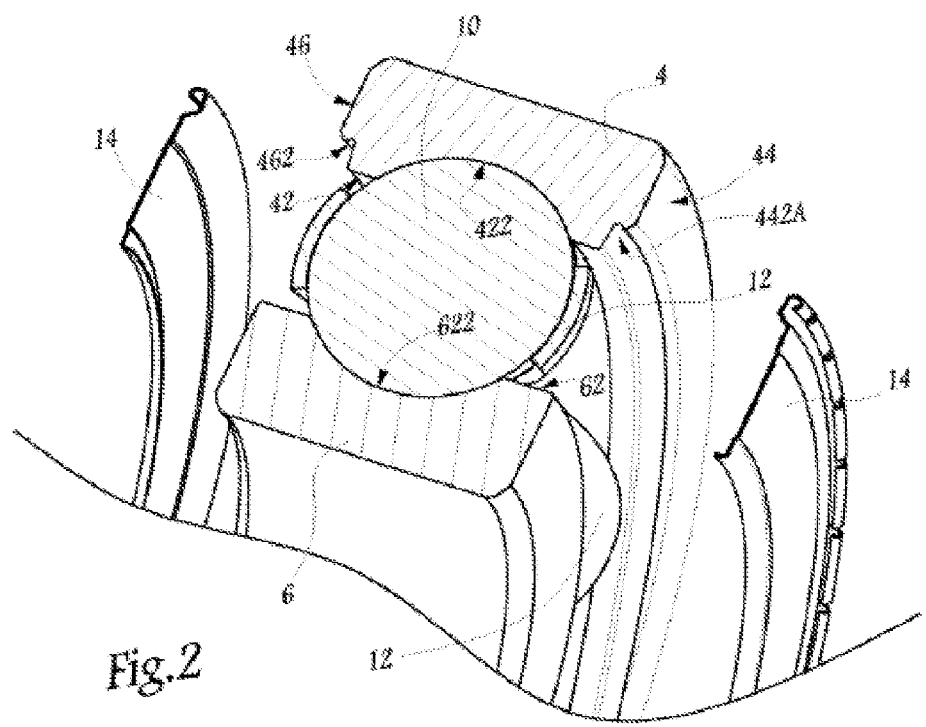
FIG. 2 is a partial view in exploded perspective corresponding approximately to the detail II in FIG. 1.
Figure 3:
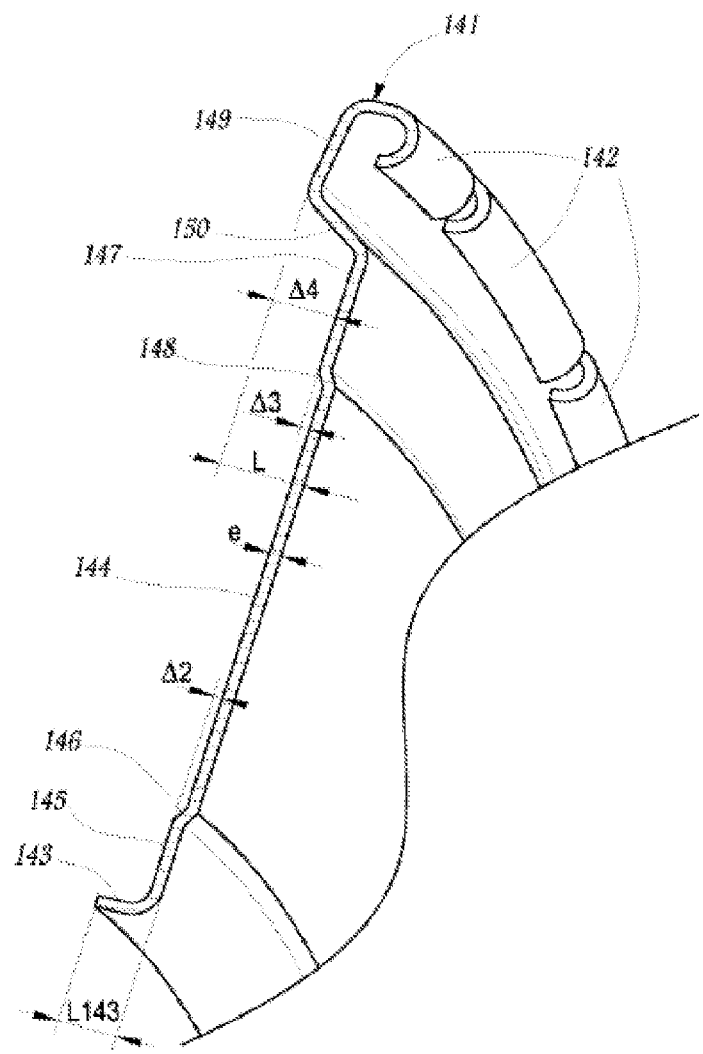
FIG. 3 is a partial view, in cross section and in perspective, of a flange belonging to the rolling bearing of FIGS. 1 and 2.

The rolling bearing 2 represented in the figures comprises a non-rotating outer ring 4 and a rotating inner ring 6 between which there is defined a rolling chamber 8 in which is arranged a series of balls 10 held in place by a cage 12.

As a variant, other rolling bodies can be used, for example rollers or needles.

X2 is used to denote the central axis of the rolling bearing 2, that is to say the relative axis of rotation of the rings 4 and 6.

Two flanges 14 and 16 are respectively mounted on the outer ring 4 and extend in the direction of the inner ring 6, in order to isolate the rolling chamber 8 from the outside.

R2 denotes the radius of a circle passing through the centres C10 of the balls 10 that is qualified as mean radius of the roller bearing 2. This mean radius is sometimes qualified as "pitch". This mean radius R2 has a value equal to approximately 100 mm. In other words, the rolling bearing 2 has relatively large dimensions, such that the manufacturing and assembly tolerances can have a significant influence on the respective positioning of the constituent elements of the rolling bearing 2.

In practice, the invention is very advantageously applicable to rolling bearings with a mean radius greater than 75 mm, preferably greater than 90 mm.

The flanges 14 and 16 are identical and the explanations that follow and which relate to the flange 14 can be transposed to the flange 16.

The flange 14 is centred on an axis X14 which is the same as the axis X2 in the configuration with the flange 14 mounted on the ring 4.

44 and 46 respectively denote the lateral faces of the outer ring 4 which are at right angles to the axis X2 and in the vicinity of which the flanges 14 and 16 are respectively mounted. 42 denotes the inner radial face of the ring 4 in which is defined a raceway 422 for the balls 10. At the junction between the faces 42 and 44, a notch 442 extends over the entire periphery of the ring 4 and constitutes a volume for partially receiving and wedging a part of the flange 14. Similarly, a notch 462 extends over the periphery of the ring 4, at the junction between the faces 42 and 46 for the reception of a part of the flange 16.

P2 denotes a median plane of the rolling bearing 2 which is at right angles to the axis X2 and situated midway between the faces 44 and 46. This plane passes through the centres C10 of the balls 10.

The flange 14 comprises, in proximity to its outer radial edge 141, a number of tabs 142 folded back towards the outside of the rolling bearing in the configuration with the flange 14 mounted on the ring 4. In practice, as explained below, the flange 14 is crimped into the notch 442 by plastic deformation of the edge 141 and of the tabs 142.

143 denotes the inner radial edge of the flange 14. This edge is made up of a portion of the flange 14 which is cylindrical, folded back towards the chamber 8 and parallel to an outer radial face 62 of the ring 6 in which is formed a raceway 622 for the balls 10.

The folded-back edge 143 is not in contact with the surface 62 but delimits, with the latter, an annular space E of low radial width compared to the radius R2, which prevents impurities or moisture from penetrating into the rolling chamber 8 through this space E. The flange 14 therefore provides a function of isolation of the chamber 8 from the outside.

In an intermediate area between the edges 141 and 143, the flange 14 comprises a first annular band 144 which is planar, centred on and at right angles to the axis X14.

Between the band 144 and the edge 143, the flange comprises a second annular band 145 parallel to the band 144 and offset axially relative to this band, along the axes X2 and X14, over a non-zero distance Δ2.

A first tapered setback 146 is thus formed between the bands 144 and 145 to allow for the axial offset of these bands relative to one another. R146 denotes the mean radius of this setback, that is to say the radius of a circle centred on the axis X14 and passing midway between the bands 144 and 145.

Opposite the band 145 relative to the band 146, that is to say radially outside the band 144, the flange 14 comprises a third annular band 147 which is parallel to the band 144 and is linked thereto by a second tapered setback 148 symmetrical to the setback 146. Thus, the band 147 is offset, along the axes X2 and X14 in the direction of the chamber 8 relative to the band 144, over a non-zero distance Δ3.

The distances Δ2 and Δ3 are equal. As a variant, they can be different.

R148 denotes the mean radius of the setback 148, that is to say the radius of a circle centred on the axis X14 and passing midway between the bands 144 and 147.

The flange 14 also comprises a fourth band 149 arranged between the edge 141 and the band 147 and linked thereto by a tapered band 150 which forms a third setback such that the end of the band 149 closest to the band 147 is offset along the axes X2 and X14 towards the inside of the rolling bearing 2 over a distance Δ4 which is non-zero and, in practice, greater than the distances Δ2 and Δ3. The band is wider than the tapered bands which form the setbacks 146 and 148.

R150 denotes the mean radius of setback 150, that is to say the radius of a circle centred on the axis X14 and passing midway between the bands 147 and 149.

Figure 4:
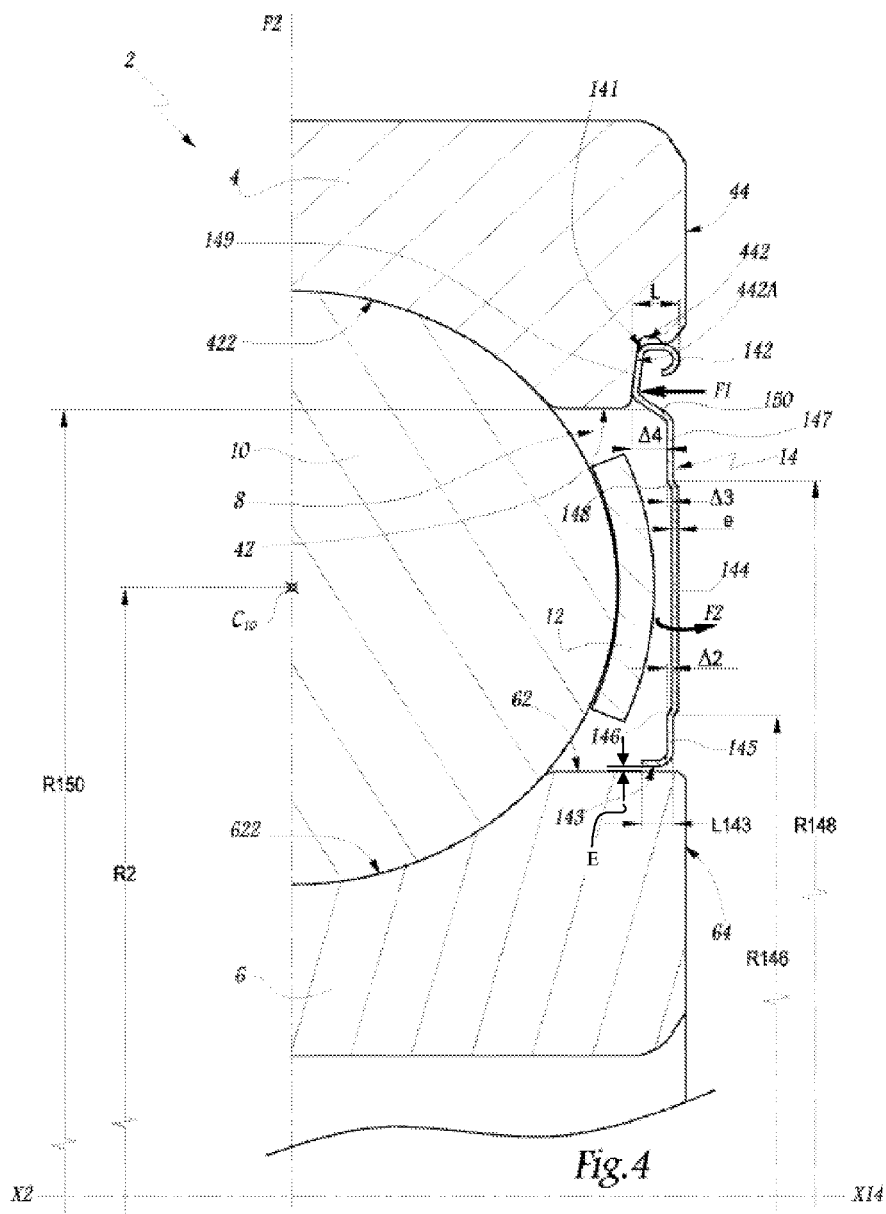
FIG. 4 is a half-section on a larger scale of the part of the rolling bearing that can be seen in cross section in FIG. 1.

The band 149 can be accessed from the outer side of the flange 14 which is oriented towards the outside of the rolling bearing 2 in the mounted configuration, which makes it possible to exert a force to push the band 149 against a surface 442A of the groove 442, as represented by the arrow F1 in FIG. 4, without being hampered by the teeth 142 which do not completely mask the surface 149 seen from the outside. The edge 141 and the teeth 142 make it possible to exert a centrifugal force to immobilize the flange 14 in the notch 442. Thus, the parts 141 and 142 constitute means for immobilizing the flange 14 on the ring 4.

The band 144 is offset, along the axes X2 and X14 and towards the outside of the rolling bearing 2, relative to these fastening means, but without extending beyond the faces 44 and 64. The axial offset between the surface 149 and the band 144 is equal to the sum of the offsets Δ3 and Δ4.

e denotes the thickness of the flange 14 in a part that is not bent, that is to say in a planar part such as one of the bands 144, 145, 147 and 149. This thickness e is equal to the thickness of the sheet metal plate from which the flange 14 is cut before being shaped.

Moreover, L denotes the overall width of the flange 14 measured parallel to the axis X14 or the axis X2 in the configuration with the flange 14 mounted on the ring 4. This width L is equal to the sum of the distances Δ3 and Δ4 and the thickness e.

The ratio e/L is less than 0.2. In other words, the actual thickness of the flange 14 is very much less than its axial width.

In practice, the thickness e can be chosen to be less than 0.5 mm, preferably equal to 0.4 mm, which makes it possible to lighten the flange 14 and reduces its axial bulk, in particular at the level of the first band 144. Thus, the flange 14 does not interfere with the cage 12, although it does not extend radially beyond the lateral surface 44 of the ring 4 and the lateral surface 64 of the ring 6 arranged in the extension of the surface 44.

Moreover, the ratio of the radius R146 to the radius R2 is between 0.85 and 0.95. In practice, the value of this ratio can be set at 0.9.

Also, the ratio of the radius R148 to the radius R2 is between 1.05 and 1.15. In practice, the value of this ratio can be set at 1.09.

The respective values of the ratios R146/R2 and R148/R2 determine the radial width of the band 144, which constitutes the part of the flange 14 which has to be as far as possible away from a median plane P2 of the rolling bearing 2 so as not to interfere with the cage 12, which has a maximum width relative to the plane P2 in the vicinity of the part of the mean radius of the rolling bearing 2.

The ratio of the radius R150 to the radius R2 is between 1.05 and 1.30. In practice, this radius can be set at 1.15.

Furthermore, the half-cone angles of the setbacks 146, 148 and 150 are between 30° and 50°, preferably equal to 35° and the ratio Δ2/Δ4 or Δ3/Δ4 is between 0.05 and 0.30, preferably equal to 0.14.

Given the geometry of the flange 14, and in the case where the crimping of its edge 141 and of its teeth 142 in the groove 442 might have the consequence of pivoting through the umbrella effect, a possible tilting of the flange 14 in the direction of the arrow F2 in FIG. 4 would not necessarily have the effect of causing the flange 14 to extend laterally outwards beyond the faces 44 and 64, particularly because the thickness e is small compared to the width L and because the edge 143 is folded back towards the plane P2, that is to say towards the rolling chamber 8.

L143 denotes the axial length of the folded-back edge 143, that is to say the length over which the latter extends, parallel to the axis X14, from the outer surface of the band 145. The ratio L143/e of the length L143 to the thickness e is chosen to be greater than 4, preferably greater than 5. Thus, the space E has an axial length that is sufficient to effectively prevent the penetration of impurities or moisture into the chamber 8.

It should be noted that the setbacks 146 and 148 make it possible to increase the rigidity of the part of the flange 14 made up of the bands 144, 145 and 147, whereas its thickness e has a small value, as envisaged above.

According to a variant of the invention that is not represented, the flanges 14 and 16, even one of them, can be fastened onto the inner ring 6. Their folded-back edge is then arranged in the vicinity of the surface 42 of the outer ring 4.

As a variant, the rolling bearing 2 may comprise only a single flange.

The invention claimed is:

1. A rolling bearing comprising:
an outer ring;
an inner ring, the inner ring and the outer ring being rotatable relative to one another about an axis of rotation;
a plurality of rolling bodies arranged in a rolling chamber formed between the outer ring and the inner ring; and
at least one flange mounted on a first ring, the first ring being one of the outer and inner rings, and extending to a vicinity of a second ring, the second ring being one of the outer and inner rings, the at least one flange having a first end portion fastened onto the first ring, and the at least one flange having a first annular band positioned perpendicular to the axis of rotation,
wherein the at least one flange provides a second annular band and a third annular band arranged respectively radially inside and radially outside the first annular band and offset relative thereto, along the axis of rotation and in a direction of the plurality of rolling bodies, by a first setback and a second setback respectively linking the first annular band and the second annular band and the first annular band and the third annular band,
wherein the at least one flange provides a fourth band arranged radially between the third annular band and the first end portion, the fourth band being offset relative to the third annular band, along the axis of rotation and in the direction of the plurality of rolling bodies by a third setback, and
wherein a second end portion of the at least one flange, opposite to the first end portion, is folded back towards the rolling chamber and extends in a direction parallel to a radial surface of the second ring.

2. The rolling bearing according to claim 1, wherein a first ratio of the thickness of the at least one flange to its axial width, measured parallel to the axis of rotation, is less than 0.2.

3. The rolling bearing according to claim 2, wherein a second ratio of a mean radius of the first setback to a mean radius of the rolling bearing is equal to 0.9.

4. The rolling bearing according to claim 2, wherein a second ratio of a mean radius of the first setback to a mean radius of the rolling bearing is between 0.85 and 0.95.

5. The rolling bearing according to claim 1, wherein a ratio of a mean radius of the second setback to a mean radius of the rolling bearing is between 1.05 and 1.15.

6. The rolling bearing according to claim 1, wherein the first annular band is offset, along the axis of rotation of the outer and inner rings, relative to the first end portion.

7. The rolling bearing according to claim 1, wherein a thickness of the at least one flange is less than or equal to 0.5 mm.

8. The rolling bearing according to claim 1, wherein the second end portion of the at least one flange extends over an axial length, wherein a ratio of the axial length to a thickness of the at least one flange is greater than 4.

9. The rolling bearing according to claim 1, wherein a mean radius of the rolling bearing is greater than or equal to 75 mm.

10. The rolling bearing according to claim 1, wherein the at least one flange is crimped in place onto the first ring and wherein the first end portion is plastically deformed during the crimping of the at least one flange onto the first ring.

11. The rolling bearing according to claim 1, wherein the first ring is the outer ring.

12. The rolling bearing according to claim 1, wherein a ratio of a mean radius of the second setback to a mean radius of the rolling bearing is equal to 1.09.

13. The rolling bearing according to claim 1, wherein a thickness of the at least one flange is equal to 0.4 mm.

14. The rolling bearing according to claim 1, wherein the second end portion extends over an axial length, wherein a ratio of the axial length to a thickness of the at least one flange is greater than 5.

15. The rolling bearing according to claim 1, wherein a mean radius of the rolling bearing is greater than or equal to 90 mm.

16. The rolling bearing according to claim 1, wherein a mean radius of the rolling bearing is equal to 100 mm.

17. A rolling bearing comprising:
an outer ring;

an inner ring, the inner ring and the outer ring being rotatable relative to one another about an axis of rotation;

a plurality of rolling bodies arranged in a rolling chamber formed between the outer ring and the inner ring; and at least one flange mounted on a first ring, the first ring being one of the outer and inner rings, and extending to a vicinity of a second ring, the second ring being one of the outer and inner rings, the at least one flange having a first end portion fastened onto the first ring, the at least one flange having a first annular band positioned perpendicular to the axis of rotation, wherein the at least one flange provides a second annular band and a third annular band arranged respectively radially inside and radially outside the first annular band and offset relative thereto, along the axis of rotation and in a direction of the plurality of rolling bodies, by a first setback and a second setback respectively linking the first annular band and the second annular band and the first annular band and the third annular band, wherein the at least one flange provides a fourth band which can be accessed from outside the rolling bearing, in a direction parallel to the axis of rotation, to be subjected to a pressing force against a corresponding surface of the first ring, and wherein a second end portion of the at least one flange, opposite to the first end portion, is folded back towards the rolling chamber and extends in a direction parallel to a radial surface of the second ring.

* * * * *